Dec. 30, 1969  S. LAUX ET AL  3,487,140
PROCESS FOR THE PRODUCTION OF STONEWARE DRAINAGE PIPES
Filed Feb. 15, 1966
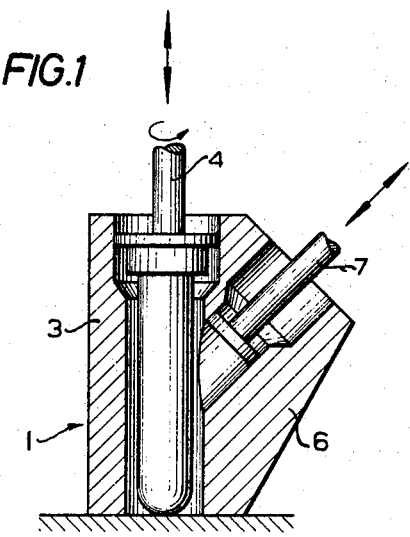
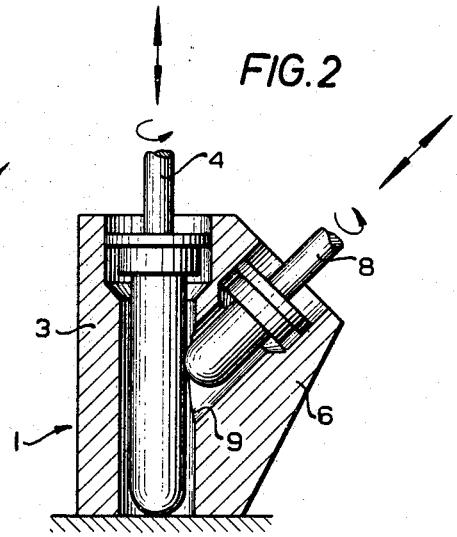
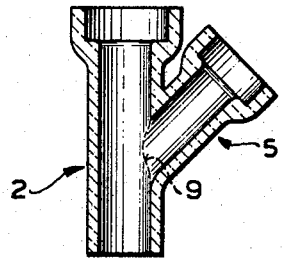
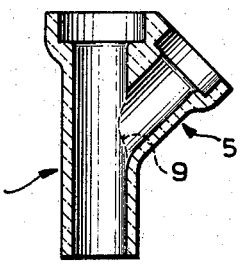
INVENTORS.
SERVATIUS LAUX
ARNO STRÖDER United States Patent Office
3,487,140
Patented Dec. 30, 1969

1

3,487,140
PROCESS FOR THE PRODUCTION OF
STONEWARE DRAINAGE PIPES
Servatius Laux, 19 am Gleuelerbach, Cologne, Lindenthal,
Germany, and Arno Ströder, 92 Kolner-Strasse, Frechen, near Cologne, Germany
Filed Feb. 15, 1966, Ser. No. 527,681
Claims priority, application Germany, Feb. 15, 1965,
C 35,101; Dec. 14, 1965, C 37,670
Int. Cl. B28b 1/48; B29c 17/08
U.S. Cl. 264—154                              3 Claims

ABSTRACT OF THE DISCLOSURE

The method of making a branch pipe of plastic clay, or the like, in which a slug of material is introduced into the main cavity of a mold provided with a branch cavity, pressing the slug by a die and causing the material to flow upwardly to form a pipe and also causing a portion of the material to flow into the branch cavity in which a piston of limitation is disposed, removing the piston and disposing a die therein to form the branched portion. The dies are rotated and the layer separating the main pipe and branch pipe is cut out.

---

With the laying of stoneware drainage pipes there are needed, besides straight pipes, structural pieces such as curves, bifurcations, or the like.

While the production of straight pipes and also of curves causes few difficulties, which the production of bifurcations a series of problems results. With such bifurcations, namely, a branch piece must be placed at a straight pipe about in the middle of its length. This branch piece is joined with a straight piece of pipe by so-called fittings. One cuts a suitable hole in the straight pipe, planes off the corresponding branch piece to be attached, presses it against the straight pipe piece and then binds both parts together by pressing them against one another and in addition fills in the seams formed therewith a soft, very plastic clay, the so-called branches.

This fitting presupposes very careful work by the workman, if the binding is to be, and in fact to remain, tight. One must therefore use well-trained, and hence expensive, workmen for this work. However, even with the most careful work it is unavoidable that with tests carried out later, a relatively high portion of the mountings appear not to be water-tight. Until now, no one had succeeded in producing remedies for this.

With the invention, a process is produced with which it is possible to produce completely water-tight bifurcations. Moreover, according to this process there is possible the production of bifurcations of this kind by mechanical means and substantially more cheaply, in relation to the production heretofore with careful hand labor.

According to the invention such a bifurcation is produced with a deep draw press, also known as a so-called pot press, whereby through a suitable combination of two pressing processes of this kind the simple production of the branch results. Therewith in especially advantageous ways there can be provided a form of execution of the bifurcation modified in relation to the form heretofore, in such a way that the sleeve ends of the branch pass over into one another directly, that is, the sleeve of the branch pieces does not sit on a severed piece of pipe. Preferably the process according to the invention is carried out in steps, that is, one first, under closing of the mold for the branch piece, presses the straight piece of pipe wherewith a part of the mass introduced into the form penetrates into the part of the form for the branch piece and then thereby means of a second pressing process is deformed for the branch piece.

The press dies preferably are therewith at the time introduced turning, whereby there results an especially easy pressing out of the mass along the wall of the form into the desired shape.

It has been shown with further tests that this process can be still further simplified, that, under closing of the opening of the form for the branch piece by one of these forming press dies, the press die forming out the straight piece of the bifurcation is inserted into the form and then the press die for the branch piece is set in rotation around the axis of the branch piece.

In this way the piston of limitation still necessary in the first mentioned process can be spared, it now being replaced by the second press die. This manner of proceeding is possible because it has been proven that the mass to be pressed slides without difficulty at the part of the second press die forming the branch piece into the corresponding part of the deep draw or pot press, and it is merely necessary for clean forming to set the press die for the branch piece in rotation.

Also with this procedure the press die for the straight piece of the bifurcation is preferably inserted turning into the form.

The drawings show in—

FIGURES 1 and 2; a press for the accomplishment of the process according to the invention in the two-stage form of execution, wherewith FIGURE 2 can also serve for the illustration of the somewhat modified process according to the invention FIGURE 3; a form of execution of a bifurcation produced according to the process according to the invention and in FIGURE 4; an especially favored form of execution of a bifurcation produced according to the invention.

FIGURE 1 shows an example of execution of a press for accomplishment of the first-mentioned process according to the invention. Into the press mold 1 there is first poured into the part of the form 3 corresponding to the straight piece of pipe 2 of the bifurcation (FIGURES 3 and 4), the press mass advantageously in the form of a pre-pressed slug. Into this press mass the turning press die 4 is then inserted, so that the press mass is pushed upward at this part of the form and therewith the straight branch piece 2 of the bifurcation is formed. At the same time with this pressing out in the straight part of the form, the surplus part of the mass, which is intended for the formation of the branch piece 5, pushes into this part 6 of the form, until it reaches the piston of limitation 7, which prevents a further pushing forward of the press mass. After conclusion of this pressing out process the piston of limitation is drawn out. Now there is also pushed into this part 6 of the form, shown in FIGURE 2, a rotating press die 8 which presses out the branch piece in the same way as with the straight piece of pipe.

Also with the second possibility of execution of the process according to the invention, in the press form 1, the press mass in the form of a pre-pressed slug is poured into the part of the form 3 corresponding to the straight piece of pipe 2 of the bifurcation. Then the press die 4 is inserted turning into this press mass, so that the press mass is pushed upward at this part of the form and therewith the straight branch piece 2 of the bifurcation is formed. At the same time with this pressing out in the straight part of the form the surplus part of the mass, which is intended for the formation of the branch piece 5, pushes into this part 6 of the form, wherewith the mass settles around the projecting part of the press die. After this process the press die 8 for the branch piece is set in rotation, whereby the branch piece is fully formed.

After conclusion of the pressing process, with both forms of execution of the process according to the invention, there remains a separating layer between the straight piece of pipe, and the branch piece of the bifurcation, which is indicated with a dotted line in FIGURES 3 and 4 at 9. The layer is subsequently cut out after the pressing out is concluded, so that the passage to the branch piece of the bifurcation is free.

Usually the branches exhibit a form as is reproduced in FIGURE 3. It is, however, completely unimportant for laying whether the branch exhibits the usual lengths reproduced in FIGURE 3. It is completely sufficient that the branch be formed as FIGURE 4 shows it.

The formation of a bifurcation reproduced in FIGURE 4 has important advantages from several viewpoints. With this form of formation the bifurcation as such is substantially more stable. The production of the branch is, directly with the use of the process according to the invention, substantially simpler and more advantageous in both its forms of execution, because the flowing movements of the mass are more advantageous. Moreover the firing of such bifurcations is substantially cheaper, because the heretofore cumbersome form of execution makes possible only a relatively small weight of trimming in the kiln.

Obviously the invention is not limited to the particulars depicted in the examples of execution. Thus there can also be produced according to the process of the invention, bifurcations with several branch pieces or in combination with curved parts, wherewith there is required for the expert merely an obvious adaption of the process according to the invention to the form of execution of the bifurcation desired at the time.

What we claim is:

1. A method of forming a branch pipe from plastic clay, and the like, which consists in providing a mold having an open ended main cavity and a branch cavity communicating with the main cavity and open at its outer end, disposing a piston of limitation in said branch cavity through said open end thereof thereby forming a small cavity within said branch cavity, introducing a slug of material into the bottom of the main cavity, pressing the slug with a die to cause the material to flow upwardly to form a pipe of the conformation of the main cavity and simultaneously forcing a portion of said material to flow into said small cavity against the face of said piston within said branch cavity, withdrawing said piston from said branch cavity while maintaining said die in said main cavity, and disposing a second die in said branch cavity and pressing said material forced therein with said second die to form the branched portion of the pipe.

2. A method as claimed in claim 1, which consists in rotating the dies for the main and branch cavities.

3. A method as claimed in claim 2, which consists in cutting out the separating layer at the juncture of the openings between the main pipe and branch pipe.

References Cited

UNITED STATES PATENTS

| | | |
|---|---|---|
| 737,841 | 9/1903 | Houts. |
| 1,622,012 | 3/1927 | McG. Ure _____ 264—311 X |
| 1,779,811 | 10/1930 | Harvey _____ 264—296 |
| 2,681,494 | 6/1954 | Weber _____ 25—127 X |
| 2,699,591 | 1/1955 | Gould et al. _____ 264—312 X |
| 3,200,184 | 8/1965 | Schulze _____ 264—296 |
| 3,340,337 | 9/1967 | Schulze _____ 25—39 X |

FOREIGN PATENTS

| | | |
|---|---|---|
| 510,786 | 10/1930 | Germany. |
| 268,220 | 3/1927 | Great Britain. |

ROBERT F. WHITE, Primary Examiner

S. I. LANDSMAN, Assistant Examiner

U.S. Cl. X.R.

25—27, 30, 39; 264—296, 312, 323